INVENTOR.
Harold William Fawcett

July 12, 1932. H. W. FAWCETT 1,866,638
CENTRIFUGAL SEPARATOR
Filed Jan. 3, 1930 2 Sheets-Sheet 2

INVENTOR.

Patented July 12, 1932

1,866,638

UNITED STATES PATENT OFFICE

HAROLD WILLIAM FAWCETT, OF HARROGATE, ENGLAND

CENTRIFUGAL SEPARATOR

Application filed January 3, 1930, Serial No. 418,300, and in Great Britain January 3, 1929.

This invention relates to improvements in centrifugal separators and aims at providing a centrifugal separator which will be simple in construction, operate substantially automatically and which will necessitate practically no cleaning for much longer periods than hitherto usual.

More particularly the invention relates to centrifugal separators of the type in which the solid constituents separated out from the liquor undergoing treatment are discharged through suitable discharge apertures or the like, provided on the machine, for example at the outer periphery of the casing and at points intermediate between the periphery of the casing and the axis of rotation of the machine.

Centrifugal separators of the foregoing type suffer from the drawbacks either that the discharge apertures for the solid matter are liable to become choked or that a substantial proportion of liquid which it is desired to recover, issues along with the solid matter from the discharge apertures.

The present invention aims at overcoming these drawbacks and contemplates broadly supplying separately to the interior of the separator, an additional liquid or liquids in sufficient amounts substantially to prevent the useful liquid undergoing purification from issuing with the solid particles discharged from the machine.

The present invention further contemplates a method of operating centrifugal separators of the aforesaid type, which comprises supplying to the interior of the separator one or more additional liquids, keeping said additional liquid or liquids separate from the useful liquid undergoing treatment in the separator, until said additional liquid or liquids reaches or reach the vicinity of the discharge apertures for the separated solid matter and controlling or regulating the pressures of said useful liquid and/or additional liquid or liquids in the interior of the separator in such a manner that said additional liquid or liquids is or are caused to occupy a certain space or spaces in the separator between the discharge apertures for the separated solid matter and the space occupied by the useful liquid and is or are caused to present a substantially stationary interface to the liquid undergoing purification.

The additional liquids employed may be water or any other suitable liquids which preferably contain no solid particles in suspension and may be miscible or immiscible with the useful liquid.

In order to ensure the successful carrying out of the invention the centrifugal separator must be provided with one or more conduit systems for the additional liquid or liquids, adapted to keep said additional liquid or liquids separate from the useful liquid undergoing treatment in the separator, said conduit system terminating at or in the vicinity of the discharge nozzles for the separated solid matter.

The conduits for the first or primary additional liquid must be of a diameter larger than the diameter of the most constricted portion of the outlet nozzles for the separated solid matter.

Further objects and advantages of the present invention will become apparent as the description thereof proceeds.

In the accompanying drawings:—

In the drawings, like parts are indicated by like characters of reference.

Figure 2:
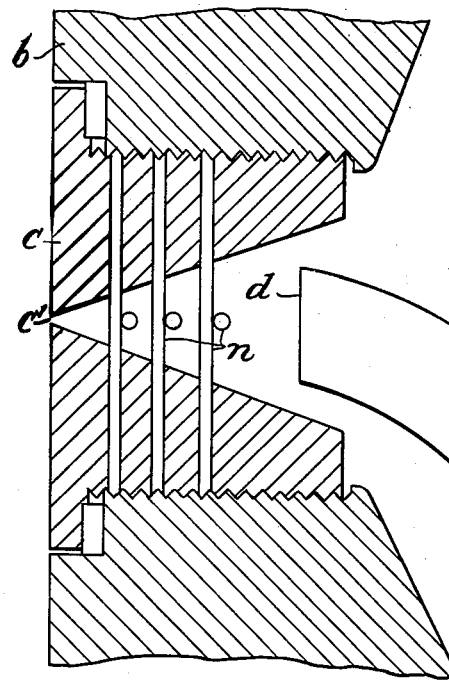
Fig. 2 shows on a larger scale, a detail of Fig. 1.
Figure 1:
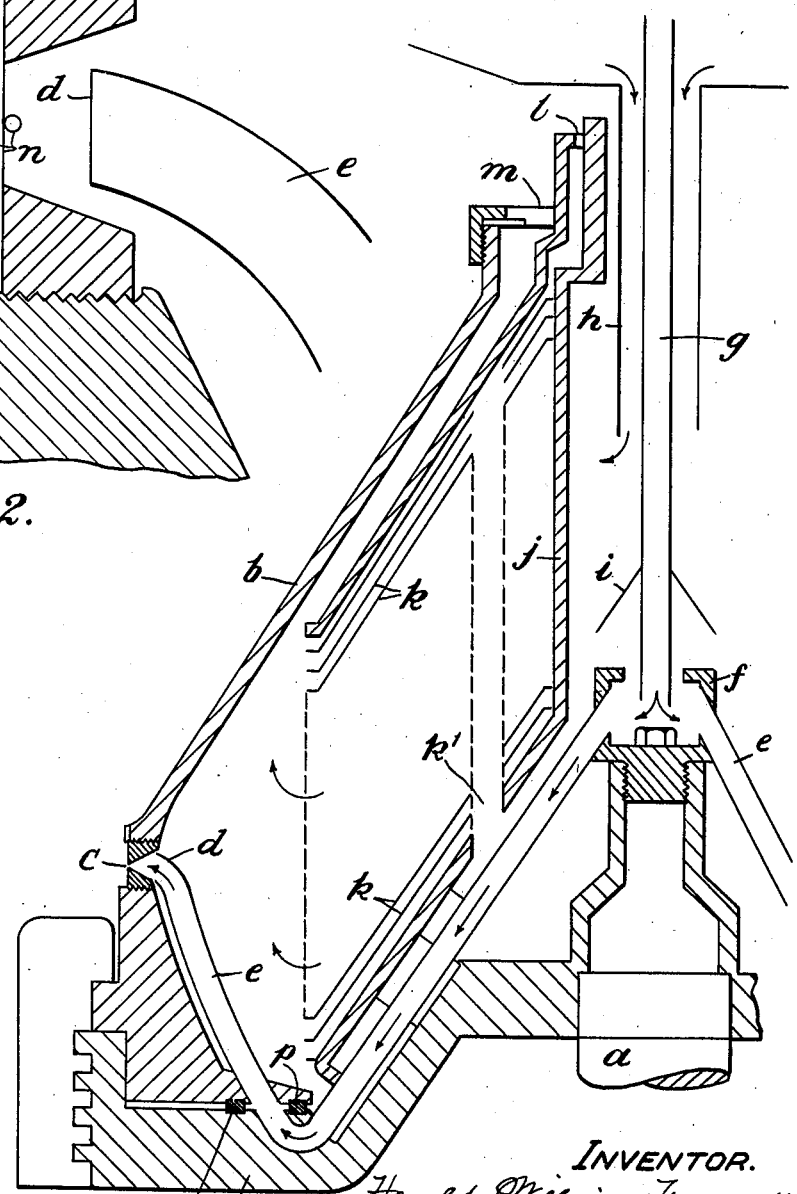
Fig. 1 is a half vertical section taken through one embodiment of centrifugal separator constructed and operating in accordance with the invention.

In the embodiment shown in Figs. 1 and 2, $a$ indicates the rotary spindle of a centrifugal separator on which is mounted the rotary bowl $b$ which is provided with bays into the apices of which are screwed plugs $c$ each having an aperture $c'$ from which the solid matter separated out in the interior of the separator is discharged. Opposite to and directed towards each aperture $c$ is a nozzle $d$ of substantially larger diameter than the most constricted portion of the aperture $c'$ and constituting the end of a pipe $e$ leading, following the contour of the base $b'$ of the bowl $b$, from a small chamber $f$ located at the middle of the separator.

The nozzle $d$ preferably projects into the interior of the plug $c'$ to such an extent that only a small annular space is available as interfacial area between the additional liquid occupying the interior of the plug $c$ and the liquid undergoing separation in the separator and at the same time the additional liquid is shielded from eddy effects tending to break up the stationary interface.

Additional liquid, for instance water, is supplied to the container $f$ by an axial pipe $g$, whereas the liquor from which solid constituents are to be separated, (e. g. wool washing liquor), is supplied into the main bowl $b$ by a pipe $h$ surrounding the pipe $g$.

The container $f$ is shielded from entry thereinto of the industrial liquor by a conical hood $i$ or may be connected to the pipe $g$ by a yielding connection.

The liquor passes from the pipe $h$ down a surrounding distributor tube $j$, to ascend through holes $k'$ in the usual conical plates $k$ of the separator.

Under the centrifugal action the separated grease is discharged at $l$ whereas the purified liquor is discharged at $m$.

The concentrated solid matter separated from the bulk of the industrial liquor accumulates in the bays of the bowl $b$ and tends to be discharged by the centrifugal action through the apertures $c'$ through which more or less of the liquor also tends to be discharged.

However, the additional liquid issuing from the nozzles $d$ minimizes or prevents the discharge therethrough of said liquor whilst ejecting therethrough the solid matter which issues from the apertures $c'$ dispersed in the additional liquid, so that a substantially liquid phase issues from said apertures $c'$ and all danger of said apertures choking is avoided.

The actual discharge from the apertures $c'$ preferably occurs in a direction opposed to the direction of rotation in order to check the velocity of the ejected jets and by reaction to promote the rotation of the separator. This may be effected by suitable inclination of the axes of the apertures $c'$ or by external deflecting surfaces on the bowl $b$.

The apertures $c'$ are conically convergent in section and, as shown in Fig. 2, may be intersected by stout rods $n$ to form a sieve-like grid to break up the ejected solid matter.

To enable the body $b$ of the bowl to be dismantled from its base $b'$ without hindrance by the pipes $e$, the latter are interrupted at the junction between the bowl $b$ and its base $b'$, but leakage is there prevented by packing rings $o$, $p$ interposed between the bowl $b$ and its base $b'$. Liquor containing dirt may, in certain cases, be used as the additional liquid, but in such case the nozzle pipes $e$ should have a constant slope outwards from the container $f$ to the nozzles $e$, so as to avoid pockets in which the dirt can accumulate and block the pipes.

Figure 3:
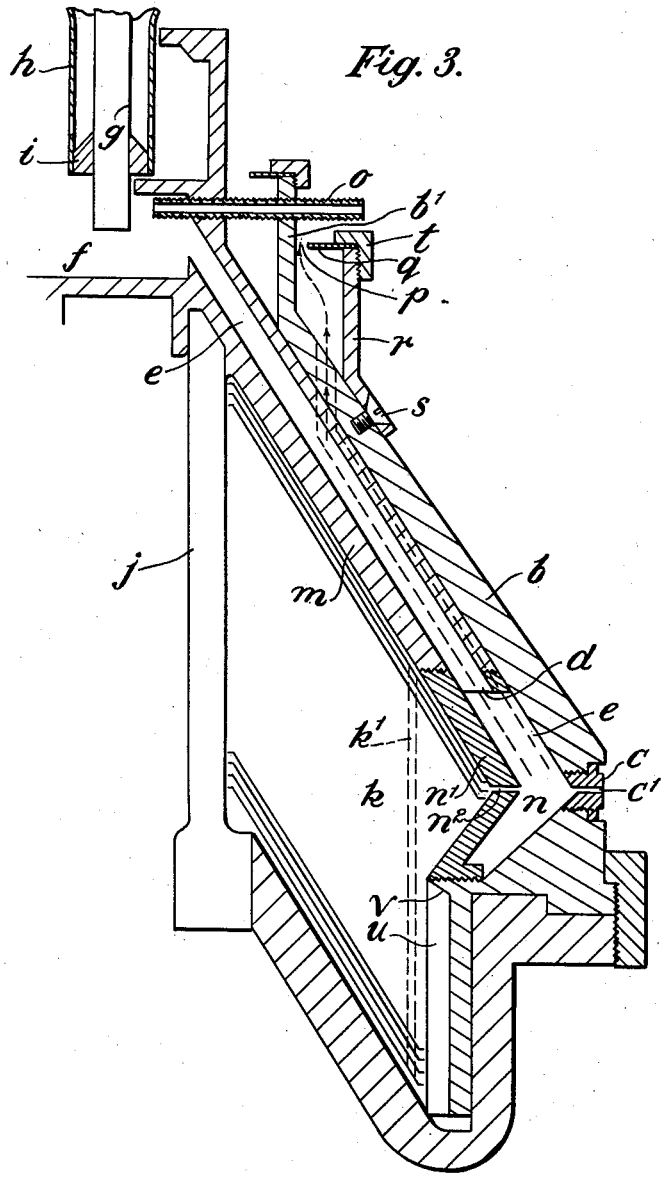
Fig. 3 is a partial vertical section of a further embodiment of the invention.

In the embodiment illustrated in Fig. 3, the chamber $f$ instead of being situated at the middle of the bowl $b$ is located on the top of the bowl and the pipe $e$ is formed in a liner $m$ between the internal periphery of the casing $b$ and the discs $k$. Each passage $e$ leads to a chamber $n$ formed in a screw-threaded plug $n'$ secured to the liner $m$ and abutting tightly against the casing $b$. The screw-threaded member $n'$ is provided with a passage $n^2$ establishing communication between the space $n$ and the space in the interior of the separator. Screwed into the casing $b$ are plugs $c$ each having a boring $c'$ forming a discharge aperture for separated solid matter. It will be evident from the drawings that only a very small area determined by the area of the passage $n^2$ is available as an interface between the additional liquid supplied through the passages $e$ and the liquid undergoing purification in the interior of the separator.

According to the invention, an auxiliary liquid is supplied through the pipe $g$ and the centrifugal head of same in the passage $n^2$ is adjusted or regulated to equalize the centrifugal head of the useful liquid at the interface between said liquids in the passage $n^2$ and thereby to prevent any flow of useful liquid through the passage $n^2$ into the chamber $n$ and vice versa. To this end excess of auxiliary liquid is supplied through the pipe $g$ and the excess is evacuated through adjustable centrifugal overflow means consisting of screw-threaded tube $o$ screwed into an upstanding continuation $b^1$ of the casing $b$ and passing into a chamber $f$ into which the excess of auxiliary liquid enters through the passage $e$. Under the action of centrifugal force the liquid in chamber $f$ tends to form a vertical wall the thickness of which corresponds to the extent to which the tube $o$ projects into the chamber $f$.

Additional centrifugal over-flow means are likewise provided alternative to or in conjunction with the tube $o$ which comprise a return passage $e'$ shown in the drawings in dotted lines, leading excess of additional liquid out through an opening $p$, the radius of which is adapted to be adjusted by employing annular discs $q$ of different sizes which are secured to a member $r$ fixed on the casing $b$ by screw $s$ by means of a screw ring $t$.

In order to avoid the disadvantage of the heavy constituent thrown outwards by the rotating plates $k$ entering a zone where it is no longer subjected to a thin layer separation treatment and where it is thus liable to be carried away by a lighter constituent discharged from the machine, the centrifugal separator is so constructed that a minimum clearance is left between the outer periphery of the plates $k$ and the internal periphery of the casing $b$, whilst the plates $k$ may be provided with apertures $k'$ in the vicinity of their outer periphery which are adapted to permit of the normal flow to or from said plates of liquor which is to be purified or which has been purified in the separator. These perforations may preferably be so located and be of such individual and collective area that the liquor escapes without undue velocity and swirl such as would tend to carry the heavy constituent therewith.

The separator is further constructed in such a manner as to provide for the formation of a wall of heavy liquid $u$, such as for example water when centrifuging oil above or below the discharge aperture $c'$ and immediately adjacent to the periphery of the machine, onto which wall a heavy component of the liquor undergoing centrifugal treatment is deposited and floats, ultimately passing over one or more ridges, weirs or the like $v$ of suitable configuration adapted to allow the heavy liquid to be adjacent to the periphery of the bowl but permitting the heavy component to weir over into the space $n$. The heavy liquid may be supplied to the machine either in admixture with the liquor to be purified or preferably from a separate source.

The two sets of bays may be superimposed in the same machine and if necessary, one set of additional liquid supply pipes $d$ may be provided for each or any of the superimposed bays.

Throttling or regulating means such as valves or the like may be provided at the discharge apertures for the separated solid matter in order to regulate the outlet of the solid matter and foreign liquid and/or to permit by their opening of a sudden rush of the separated solid matter and foreign liquid to flush out any blockage in the discharge apertures.

It is advantageous to automatically regulate the correct quantity of foreign liquid supplied to the machine. This can be done by employing any means to measure the outflow of liquid from the discharge means for the separated solid matter, and employing this to automatically regulate the supply of foreign liquid to the separator. In certain cases it is advantageous to supply the foreign liquid to the machine at a higher rate than it is discharged therefrom, in which case the excess of foreign liquid can, in accordance with ordinary practice, be separately discharged from the separator.

The chambers or pipes through which the foreign liquid flows inside the separator may be heat-insulated so as to enable foreign liquids of varying temperature to be employed without affecting the temperature of the liquid undergoing purification.

In accordance with the invention, means are provided in the supply or discharge system for the useful and/or additional liquids which are adapted to regulate or control the pressure of one or more of said liquids.

The quantities of all liquids supplied may be automatically controlled; for example, automatic means may be employed to regulate the quantity of liquor discharged from the discharge apertures for the separated solid matter and these may be employed to regulate the supply of additional liquid or liquids. Means may also be provided for maintaining constant the speed of the separator and thereby to maintain constant the pressures of the liquids in the separator. The pressures of the liquids may also be controlled by controlling their specific gravity.

Advantageously the walls surrounding the junction point or points of the useful and additional liquids are approximately in line with the centrifugal force and/or are provided with means for preventing the formation of layers or streams interflowing between the adjacent liquids.

For the purpose of ensuring equalization of pressure in the event of one or more discharge nozzles for separated solid matter being of a greater diameter than or becoming more worn than the remaining nozzles, the conduits for the additional liquid may be interconnected, for example, by a tube extending along the internal periphery of the separator.

It is possible to prevent any loss or dilution of useful liquid whatsoever by interposing between the useful and primary additional liquids, a third liquid which is of greater specific gravity than the useful liquid and is not miscible with the same. By suitably selecting or controlling the pressures of said liquids and/or by arranging for a slight flow of the second additional liquid into the discharge of separated solid matter and first additional liquid.

The degree of contamination of the useful liquid by additional liquids may be reduced by decreasing the area of the useful or additional liquid interface or providing restriction of the useful liquid space above the interface.

It is in some cases preferable that the depth of the layer of the second additional liquid be regulated by centrifugal overflow means. Said liquid may be fed into the machine either mixed with the useful liquid or by a separate supply system which may for example surround the supply system of the first additional liquid.

Where a second additional liquid is used which is heavier than the useful liquid but miscible therewith the foregoing means are sufficient to reduce the loss of the useful liquid to very small limits indeed. If however a third additional liquid be suitably introduced which is non-miscible with the useful liquid and the second additional liquid and has a specific gravity between that of these two liquids it will form a layer between said liquids and prevent all loss of useful liquid. Said third additional liquid may be introduced separately or mixed with the useful liquid.

Such an arrangement made in certain cases have the advantage that the bulk of the liquid discharged with the dirt from the machine could be waste liquor or cheap liquor such as water, the second additional liquid which must be of suitable gravity would be a small proportion of the quantity of the first additional liquor used and may be a cheap liquid such as a salt solution. The third additional liquid which might be expensive would only be required in minute quantities. When the interfaces of the additional liquids and useful liquids are substantially tranquil or there is a flow of these liquids outwards from the separator they present no obstruction, other than surface tension effects, to the passage of the separated solid matter through these interfaces outwards from the separator.

The separator may be supplied with an excess of additional liquid which, during the separation, occupies a zone in the interior of the separator i. e. either in the chamber $f$ or adjacent to the nozzle $c'$ located at a certain distance from the axis of the separator. In the vicinity of said zone are provided one or more apertures or the like through which the excess of foreign liquid is adapted to escape.

Said aperture or apertures are made of such small or adjustable dimensions that if an appreciable amount of additional liquid be fed to the separator in excess of that passing through it, then said liquid will form a wall inside the overflow point and thereby increase the pressure of the additional liquid inside the centrifuge. The depth of said wall will depend on the amount of excess liquid supplied. In this way, it is possible to vary the pressures of liquid while the centrifuge is rotating or automatically to compensate alterations of gravity of the liquid undergoing centrifugation or of additional liquid or liquids fed to the separator while the latter is running.

The centrifugal overflow means may if desired, be provided with throttling means adapted to throttle the outflow of additional liquid or liquids therethrough to a greater or less extent and thus to increase or decrease the pressure of said additional liquid or liquids and thereby the extent of the zone occupied by said additional liquid or liquids in the interior of the separator.

I claim:—

1. In a centrifugal separator for separating solids from liquids, a rotary bowl having a peripheral discharge aperture for separated solids, inlet means to said bowl for useful liquid to be purified, means for supplying separately from said useful liquid an auxiliary liquid inside said bowl to the vicinity of said discharge aperture, means in the vicinity of said discharge aperture, establishing communication between the useful and auxiliary liquids, said communication-establishing means having an area which is a multiple of that of said discharge aperture and adjustable outflow means on said bowl additional to said discharge aperture, for excess auxiliary liquid supplied, said outflow means being adjusted to maintain a substantially stationary interface between said auxiliary liquid and said useful liquid in said communication-establishing means.

2. In a centrifugal separator for separating solids from liquids, a rotary bowl having a peripheral discharge aperture for separated solids, a plurality of conical separating plates within said bowl, inlet means to said bowl for useful liquid to be purified, means for supplying separately from said useful liquid an auxiliary liquid inside said bowl to the vicinity of said discharge aperture, means in the vicinity of said discharge aperture, establishing communication between the useful and auxiliary liquids, said communication-establishing means having an area which is a multiple of that of said discharge aperture and adjustable outflow means on said bowl additional to said discharge aperture, for excess auxiliary liquid supplied, said outflow means being adjusted to maintain a substantially stationary interface between said auxiliary liquid and said useful liquid in said communication-establishing means.

3. In a centrifugal separator for separating solids from liquids, a rotary bowl having a peripheral discharge aperture for separated solids, inlet means to said bowl for useful liquid to be purified, means for supplying separately from said useful liquid an auxiliary liquid inside said bowl to the vicinity of said discharge aperture, means in the vicinity of said discharge aperture, establishing communication between the useful and auxiliary liquids, said communication-establishing means having an area which is a multiple of that of said discharge aperture and outflow means on said bowl additional to said discharge aperture, for excess auxiliary liquid supplied, said outflow means being so located as to maintain a substantially stationary interface between said auxiliary liquid and said useful liquid in said communication-establishing means.

4. In a centrifugal separator for separating solids from liquids, a rotary bowl having a peripheral discharge aperture for separated solids, inlet means to said bowl for useful liquid to be purified, a conduit system for supplying separately from said useful liquid an auxiliary liquid inside said bowl to the vicinity of said discharge aperture, means in the vicinity of said discharge aperture, establishing communication between the useful and auxiliary liquids, said communication-establishing means having an area which is a multiple of that of said discharge aperture and outflow means on said bowl additional to said discharge aperture, for excess auxiliary liquid supplied, said outflow means being so located as to maintain a substantially stationary interface between said auxiliary liquid and said useful liquid in said communication-establishing means.

5. In a centrifugal separator for separating solids from liquids, a rotary bowl having a plurality of peripheral discharge apertures for separated solids, inlet means to said bowl for useful liquid to be purified, a liner constituting an inner casing and having apertures corresponding with but of an area which is a multiple of that of said discharge apertures, means for supplying an auxiliary liquid to the outer side of said liner in the vicinity of said discharge aperture, and adjustable outflow means on said bowl additional to said discharge apertures for excess auxiliary liquid supplied, said outflow means being adjusted to maintain a substantially stationary interface between said auxiliary liquid and said useful liquid in the apertures in said liner.

In testimony whereof, I affix my signature.

HAROLD WILLIAM FAWCETT.